March 26, 1968 — F. EHEIM — 3,374,685
FACE CAM DISC AND CAM FOLLOWER ARRANGEMENT
Filed Jan. 26, 1966
2 Sheets-Sheet 1
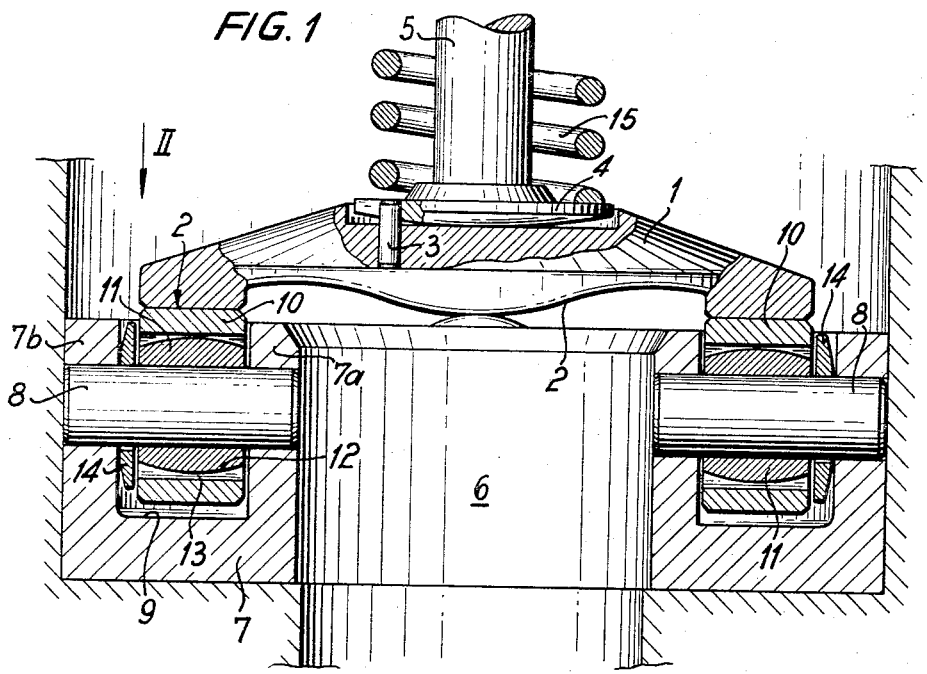

March 26, 1968  F. EHEIM  3,374,685
FACE CAM DISC AND CAM FOLLOWER ARRANGEMENT
Filed Jan. 26, 1966  2 Sheets-Sheet 2

United States Patent Office 3,374,685
Patented Mar. 26, 1968

3,374,685
FACE CAM DISC AND CAM FOLLOWER ARRANGEMENT
Franz Eheim, Rosenbergstrasse 53a, Stuttgart, Germany
Filed Jan. 26, 1966, Ser. No. 523,225
Claims priority, application Germany, Feb. 20, 1965, B 80,616
3 Claims. (Cl. 74—56)

ABSTRACT OF THE DISCLOSURE

A disc with a camming face on a surface is located in a housing; outer surfaces of a cylindrical bearing sleeve engage the camming face, and a support element having spherical outer surfaces is located with the bearing sleeve, having a diameter less than the inner diameter of the inner bearing surfaces of the sleeve to provide clearance and permit inclination of the axis of the sleeve with respect to the axis of the support element.

---

The present invention relates to a face cam disc and cam follower arrangement, and more particularly to a camming arrangement in which a camming disc is provided with an undulating face and substantial forces are exerted against the camming surface, as may arise for example during use of the arrangement to control fuel injection pumps for diesel engines.

The use of face disc type camming arrangements for fuel injection pumps is known. The disc may be provided with cam rises, corresponding to the number of cylinders to be supplied by the fuel injection pump. The camming disc bears against a solidly mounted roller plate. Relative rotation between the camming disc and the roller plate is provided for, for example by rotating the camming plate. As the camming plate rotates, up- and down-motion is imparted to it in accordance with the engagement of risers or dwells of the camming disc with the roller plate. This longitudinal motion is then transmitted to an injection pump piston.

The counter pressure from the injection pump piston, transmitted to the camming disc may cause deformation of the camming disc, such that the camming surface becomes inclined with respect to the axis of the rollers of the roller disc with which the cams cooperate. Such inclination causes rapid wear of both the camming disc and the rollers. In order to avoid uneven wear, it has been proposed to provide the rollers with a curved outer surface, such as a spherical outer surface. This avoids engagement of a pair of running surfaces which are no longer parallel; the disadvantage is, however, that the contact between the rollers and the camming disc has changed from a theoretical line contact to a theoretical, geometric point contact, causing high loading and, again wear on the accurately prepared camming surface. Providing rollers with a conical outer surface has not been found to be a solution either, since on change in loading, the contact between the rollers and the cam changes, again causing uneven wear between the rollers and the associated camming surface.

It is an object of the present invention to provide an improved disc cam and cam follower arrangement, capable of transmitting substantial forces and not subjecting the camming surface to undesired wear.

Briefly, in accordance with the present invention, a face cam disc and follower arrangement is provided, particularly for fuel injection pumps, in which the rollers are formed as cylindrical sleeves, having a cylindrical outer and a cylindrical inner surface; the outer surface of the cylindrical sleeve engages the camming face. The inner surface of the cylindrical sleeve runs on a support element which has a preferably hardened, spherical outer surface. The support element is mounted within a housing with sufficient clearance between the walls of the housing to permit inclination of the axis of the cylindrical sleeve with respect to the axis of the support element. In order to compensate for lateral forces, if the cylindrical sleeve inclines, a thrust disc is provided between the support element and the housing wall, which thrust disc has a spherical surface facing the housing wall, and is itself loosely mounted thereagainst to permit self alignment.

The structure, organization, and operation of the invention will now be described more specifically in the following detailed description with reference to the accompanying drawing, in which:

FIG. 1 is a vertical sectional view of a face cam disc and cam follower arrangement for a fuel injection pump;

FIG. 2 is a partial top plan view seen in the direction of arrow II in FIG. 1;

Figure 3:
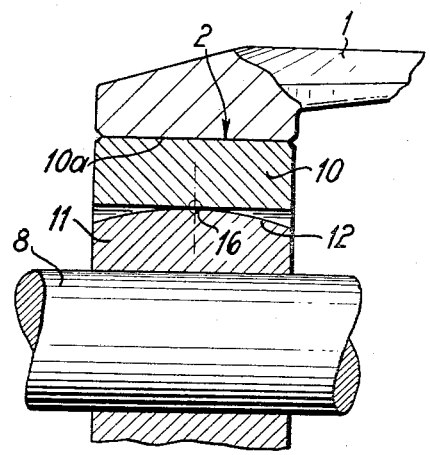
FIG. 3 is a partial enlarged view of the cam disc and follower with the cam being mechanically unloaded.

From the driven parts of a face cam disc and follower arrangement, FIG. 1 shows only the revolving face cam disc 1, together with cam track or surface 2 and flange 4 of piston rod 5, belonging to the not shown piston of an injection pump. Driving pin 3 creates a torsion proof connection between face cam disc 1 and flange 4. The central driving shaft of face cam disc 1 which has to be imagined to project downwards through the central space 6 of roller bearing housing 7 has been left out in the drawing for clarity's sake.

The housing 7, having a pair of upstanding walls 7a, 7b, supports bolts 8, as best shown in FIGS. 1 and 2. Support elements 11, having a spherical, preferably hardened, outer surface 12, are assembled over bolts 8. These support elements 11 generally in the form of rollers with the spherical outer surface 12, are rotatable with respect the bolts 8. Bearing sleeves 10, having a cylindrical outer surface and a cylindrical inner surface surround support elements 11. The bearing sleeves 10 have an inner diameter which is slightly larger than the maximum diameter of support elements 11, to provide a clearance space as shown at 13. The outer surface of the sleeves 10 extends beyond the topmost surface of walls 7a, 7b; the axial dimension of the sleeves 10 is slightly less than the space 9 between walls 7a, 7b, to provide for clearance and to permit deflection of the axis of the sleeves 10 with respect to the axis of bolt 8. A thrust disc 14, having a spherical surface adjacent side wall 7b, is located adjacent support elements 11, provided with a hole larger than the diameter of bolt 8 to permit rocking of the thrust disc 14 if the axis of sleeves 10 inclines with respect to the axis of bolt 8. Spring 15 presses the cam surface 2 against the sleeves 10.

Figure 4:
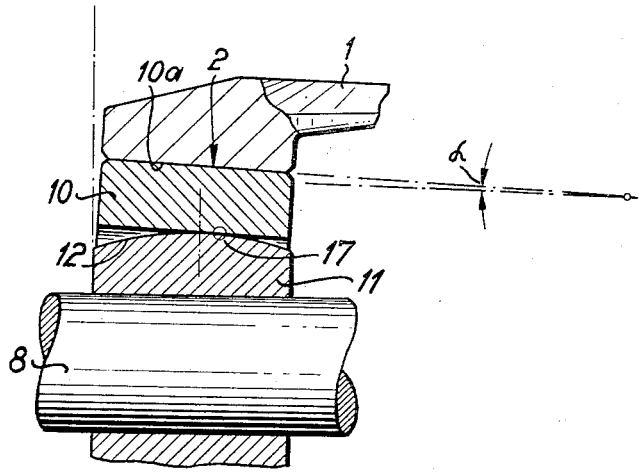
FIG. 4 is a view similar to FIG. 3, with the cam loaded.

FIGS. 3 and 4 show the relationship of the cooperating parts as the loading on the camming disc 1 varies. In FIG. 3, the line contact between camming contact 2 and the outer, cylindrical surface 10a of sleeves 10 is clearly shown. Contact is over the entire width of the camming surface 2. The inner surface of sleeves 10 is in contact with the outer surface 12 of support element 11 in the region indicated by the circle 16. If the back pressure of the injection pump increases to such an extent that the camming disc 1 deflects, so that the camming surface 2 will form an angle $\alpha$ with the axis of bolts 8, the line contact of the camming surface with the bearing sleeves itself will not change; the line contact as seen at 2 and 10a will remain the only contact between the camming surface and the bearing sleeves and the contact between the bearing sleeve and the inner support element 11 will shift from point 16 (FIG. 3) to the region shown by the circle 17 in FIG. 4. Damage to the camming surface and uneven wear of the accurately ground and lapped camming surface is thereby avoided. Lateral thrust is absorbed by the thrust disc 14, which can shift around its spherical outer surface. If the back pressure is so great that the position of the axis of bolt 8 itself shifts, the spherical surface of thrust disc 17 will likewise absorb any lateral forces and prevent change of the parallel relationship of the camming surface 2 and the outer cylindrical surface of sleeves 10.

As can be seen best from FIGS. 3 and 4, the parallel relationship of the camming surface 2 and its cooperating cam follower surface is always maintained, thus permitting high mechanical loading of the camming surface and preventing premature destruction, scoring, or wear on the accurately prepared camming surface. It is, of course, immaterial whether the camming surface 2 rotates and the bearing sleeves 11 are located within a stationary housing, or whether the housing rotates and the camming surface is rotatably fixed, or whether independent motion for the housing 7 and the camming disc 2 is provided.

A suitable radius or curvature of the spherical outer surface 12 of the support roller 11 is more than one half the diameter of the support roller 11.

What is claimed is:
1. Face cam disc and follower arrangement having a housing; a disc with a camming face on a surface thereof; a cylindrical bearing sleeve having cylindrical outer and inner bearing surfaces, the outer surface engaging said camming face; and a support element having a spherical outer surface located within said bearing sleeve and having a diameter less than the inner diameter of the inner bearing surface of said sleeve to provide clearance and permit inclination of the axis of the sleeve with respect to the axis of the support element while maintaing parallel relationship of the outer cylindrical surface of the sleeve and the camming face, said cylindrical sleeve being mounted within said housing with clearance space from the housing surfaces to permit said inclination of the axes.

2. Arrangement as claimed in claim 1 wherein said housing has a pair of upstanding walls confining said support element therebetween; and said walls are spaced apart more than the width of said cylindrical sleeve to provide side clearance space.

3. Arrangement as claimed in claim 2 including an end disc having a spherical surface facing said wall loosely mounted adjacent said support element and located between the cylindrical sleeve and said wall to provide a bearing surface against said wall and absorb axial force components arising when the axis of the sleeve inclines with respect to the axis of the support element.

References Cited

UNITED STATES PATENTS

| | | | |
|---|---|---|---|
| 1,659,238 | 2/1928 | Boyce | 74—56 |
| 2,211,741 | 8/1940 | Elwell | 74—56 |
| 2,243,821 | 5/1941 | Herrmann | 74—56 |
| 3,016,273 | 1/1962 | Benoit | 308—72 |
| 3,308,799 | 3/1967 | Bessiere | 103—154 |

FRED C. MATTERN, JR., *Primary Examiner.*

W. S. RATLIFF, *Assistant Examiner.*